(12) United States Patent
Huang et al.

(10) Patent No.: US 7,752,470 B2
(45) Date of Patent: Jul. 6, 2010

(54) METHOD AND SYSTEM FOR POWER MANAGEMENT INCLUDING DEVICE CONTROLLER-BASED DEVICE USE EVALUATION AND POWER-STATE CONTROL

(75) Inventors: Hai Huang, Marion, OH (US); Thomas Walter Keller, Jr., Austin, TX (US); Eric Van Hensbergen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1613 days.

(21) Appl. No.: 10/727,319

(22) Filed: Dec. 3, 2003

(65) Prior Publication Data

US 2005/0125702 A1    Jun. 9, 2005

(51) Int. Cl.
   *G06F 1/32*    (2006.01)
(52) U.S. Cl. .................................. 713/310; 713/321
(58) Field of Classification Search .................. 713/300, 713/310, 320, 321, 322, 323, 324, 330, 340, 713/500, 501, 502, 503, 600, 601
   See application file for complete search history.

(56) References Cited

U.S. PATENT DOCUMENTS

| | | | |
|---|---|---|---|
| 5,148,546 A * | 9/1992 | Blodgett | 713/320 |
| 5,404,543 A * | 4/1995 | Faucher et al. | 713/323 |
| 5,623,647 A | 4/1997 | Maitra et al. | |
| 6,128,641 A * | 10/2000 | Fleck et al. | 718/108 |
| 6,330,639 B1 * | 12/2001 | Fanning et al. | 711/106 |
| 6,512,652 B1 | 1/2003 | Nelson et al. | |
| 6,657,634 B1 * | 12/2003 | Sinclair et al. | 345/534 |
| 6,704,877 B2 | 3/2004 | Cline et al. | |
| 6,776,787 B2 | 6/2004 | Green | |
| 6,834,353 B2 | 12/2004 | Smith et al. | |
| 6,895,506 B1 * | 5/2005 | Abu-Husein | 713/193 |
| 6,996,441 B1 | 2/2006 | Tobias | |
| 7,000,130 B2 | 2/2006 | Adachi | |
| 2002/0004913 A1 | 1/2002 | Fung | |
| 2003/0210247 A1 * | 11/2003 | Cui et al. | 345/534 |
| 2004/0044914 A1 | 3/2004 | Gedeon | |
| 2004/0083478 A1 | 4/2004 | Chen et al. | |

(Continued)

*Primary Examiner*—Thuan N Du
(74) *Attorney, Agent, or Firm*—Mitch Harris, Atty at Law, LLC; Andrew M. Harris; Libby Z. Toub

(57) ABSTRACT

A method and system for power management including device controller-based device use evaluation and power-state control provides improved performance in a power-managed processing system. Per-device usage information is measured and evaluated during process execution and is retrieved from the device controller upon a context switch, so that upon reactivation of the process, the previous usage evaluation state can be restored. The device controller can then provide for per-process control of attached device power management states without intervention by the processor and without losing the historical evaluation state when a process is switched out. The device controller can control power-saving states of connected devices in conformity with the usage evaluation without processor intervention and across multiple process execution slices. The device controller may be a memory controller and the controlled devices memory modules or banks within modules if individual banks can be power-managed. Local thresholds provide the decision-making mechanism for each controlled device. The thresholds may be history-based, fixed or adaptive and are generally set initially by the operating system and may be updated by the memory controller adaptively or using historical collected usage evaluation counts or alternatively by the operating system via a system processor.

16 Claims, 4 Drawing Sheets

U.S. PATENT DOCUMENTS

| | | |
|---|---|---|
| 2004/0236896 A1 | 11/2004 | Kanapathippillai et al. |
| 2004/0260957 A1 | 12/2004 | Jeddeloh et al. |
| 2005/0125701 A1 | 6/2005 | Hensbergen et al. |
| 2005/0125703 A1* | 6/2005 | Lefurgy et al. .............. 713/320 |
| 2005/0138442 A1* | 6/2005 | Keller et al. ................ 713/300 |
| 2005/0160151 A1 | 7/2005 | Rawson, III et al. |

* cited by examiner

METHOD AND SYSTEM FOR POWER MANAGEMENT INCLUDING DEVICE CONTROLLER-BASED DEVICE USE EVALUATION AND POWER-STATE CONTROL

BACKGROUND OF THE INVENTION

1. Technical Field

The present invention relates generally to power management in processing systems, and more particularly, to a power management scheme that includes an intelligent device controller providing local control of device power management states.

2. Description of the Related Art

Present-day computing systems include sophisticated power-management schemes for a variety of reasons. For portable computers such as "notebook", "laptop" and other portable units including personal digital assistants (PDAs), the primary power source is battery power. Intelligent power management extends battery life, and therefore the amount of time that a user can operate the system without connecting to a secondary source of power. Power management has also been implemented over "green systems" concerns so that power dissipated within a building is reduced for reasons of energy conservation and heat reduction.

Recently, power management has become a requirement in line power connected systems, particularly high processing power cores and systems because the components and/or systems are now designed with total potential power consumption levels that either exceed power dissipation limits of individual integrated circuits or cabinets, or the total available power supply is not designed to be adequate for operation of all units simultaneously. For example, a processor may be designed with multiple execution units that cannot all operate simultaneously due to either an excessive power dissipation level or a problem in distributing the requisite current level throughout the processor without excessive voltage drop. Or, a memory subsystem may permit installation of more memory than the system power budget/dissipation budget will allow, in order to accommodate large disk/server caches, scientific data arrays and the like without having to include power distribution that can support the maximum installable memory operating at full power, since the entire memory is not generally active at all times and portions of the memory array can be put in a power-savings mode.

However, power management of memory or other system components introduces latency/availability problems in that recovery from a power saving state involves overhead that reduces processing throughput. Further, traditional memory allocation schemes within operating systems tend to exacerbate the problem by spreading frequently accessed memory locations throughout available memory. Memory allocation and processor-managed power management techniques have been proposed and implemented that alleviate this problem to some degree, but fall short of ideal due to the lack of information or latency of information about actual memory use that could otherwise provide for more efficient power management of infrequently used memory that is allocated for a running process. The above-mentioned power management schemes generally activate memory that is in a power saving state if it is used by the process activated at a context switch. Therefore, a seldom-accessed memory module (or bank) that is nonetheless allocated for a process going active will be restored from a power-saving mode at the context switch, even if keeping the memory module in the power-saving mode would only introduce a slight performance hit due to the infrequent access.

It is therefore desirable to provide a method and system for providing power management within a processing system, and in particular within a memory subsystem that can reduce power consumption by placing infrequently used resources in a power-saving state, while providing high processing throughput by maintaining low resource latency for frequently used resources.

SUMMARY OF THE INVENTION

The objective of reducing power consumption by placing infrequently used resources in a power-saving state while maintaining low latency for frequently used resources is provided in a method and system, as well as a memory controller that provides a mechanism for implementing the method and system within a memory subsystem.

The method and system provide per-device power-management control registers and per-device usage evaluators within a device controller, such as a memory controller. The per-device power-management registers are populated with power management settings for each device controlled by the device controller at each context switch. The device controller includes the ability to read and set the state of the per-device evaluators, so that the evaluator information is not lost when a context switch occurs. At each context switch, the state of the evaluators are retrieved from the device controller for each device and the states are stored so that when the process is reactivated, the state of each evaluator may be restored. The evaluators provide for local control of the power management states of each device during execution of a process by determining when device usage falls below a threshold, thereby providing for intelligent and independent power management of each device without intervention by the operating system and processor(s).

A system processor may also used the stored evaluator state information perform its own evaluation from which new power management settings and/or evaluator thresholds for the controlled devices can be determined and sent to the per-device registers within the device controller.

The device controller can be a memory controller, as mentioned above, and the controlled devices can be memory modules coupled to the memory controller. Counters and/or evaluators may alternatively be located within the memory modules (or controlled devices in general) and usage data is then read from the controlled devices by the device controller to provide usage evaluations.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns local control and evaluation of power management settings at the device controller level within a processing system. Past power-management schemes have involved the processing elements and operating system software in setting power management levels either via device controller commands or via direct control of power management states of controlled devices. Therefore, per-process granularity of power management device settings in past implementations is therefore typically limited to a time-slice interval. Further, actual implementations do not typically manage power on a per time-slice basis, due to the operating system and processor overhead that would be incurred. Existing mechanisms also typically lose any device usage measurements at a context switch, or cannot differentiate between the use of the devices by different processes. The present invention provides for measurement and evaluation of device usage on a per-process basis by providing a mechanism for reading and writing the state of an evaluator for each controlled device. When a process is deactivated, the state of the evaluators for the devices are read and stored by the operating system. When the same process is later reactivated, the stored state may be restored to the evaluators providing contiguous operation across process execution and improved control of power management states of the attached devices on a per-process basis.

Embodiments of the present invention also include usage counters/evaluators within the device controller, or alternatively, counters/evaluators within the controlled devices that are read by the device controller so that the device controller can evaluate usage of the controlled devices and change power management settings of the controlled device on a per-process basis. In the alternative embodiments that include counters within the controlled devices, the evaluator state will be updated periodically from the device usage counts, but when an evaluator is located within the controlled device, a mechanism will generally be included for storing and retrieving the evaluator state by the device controller. The state can then be stored and retrieved from the device controlled by the operating system.

The illustrative embodiment provided herein is directed toward a memory controller coupled to memory modules, but it should be understood that the techniques of the present invention may also be applied to other devices and device controllers within a processing system, such as disk controllers, peripheral controllers and network/device hub controllers. In general, controllers and devices for which there is a wait-time penalty incurred for recovery from a power saving state and in which no device responses are lost due to placing the device in a power-saving state (e.g., a hub or network controller that will wake on input) can provide reduced power usage through the techniques of the present invention.

Figure 1:
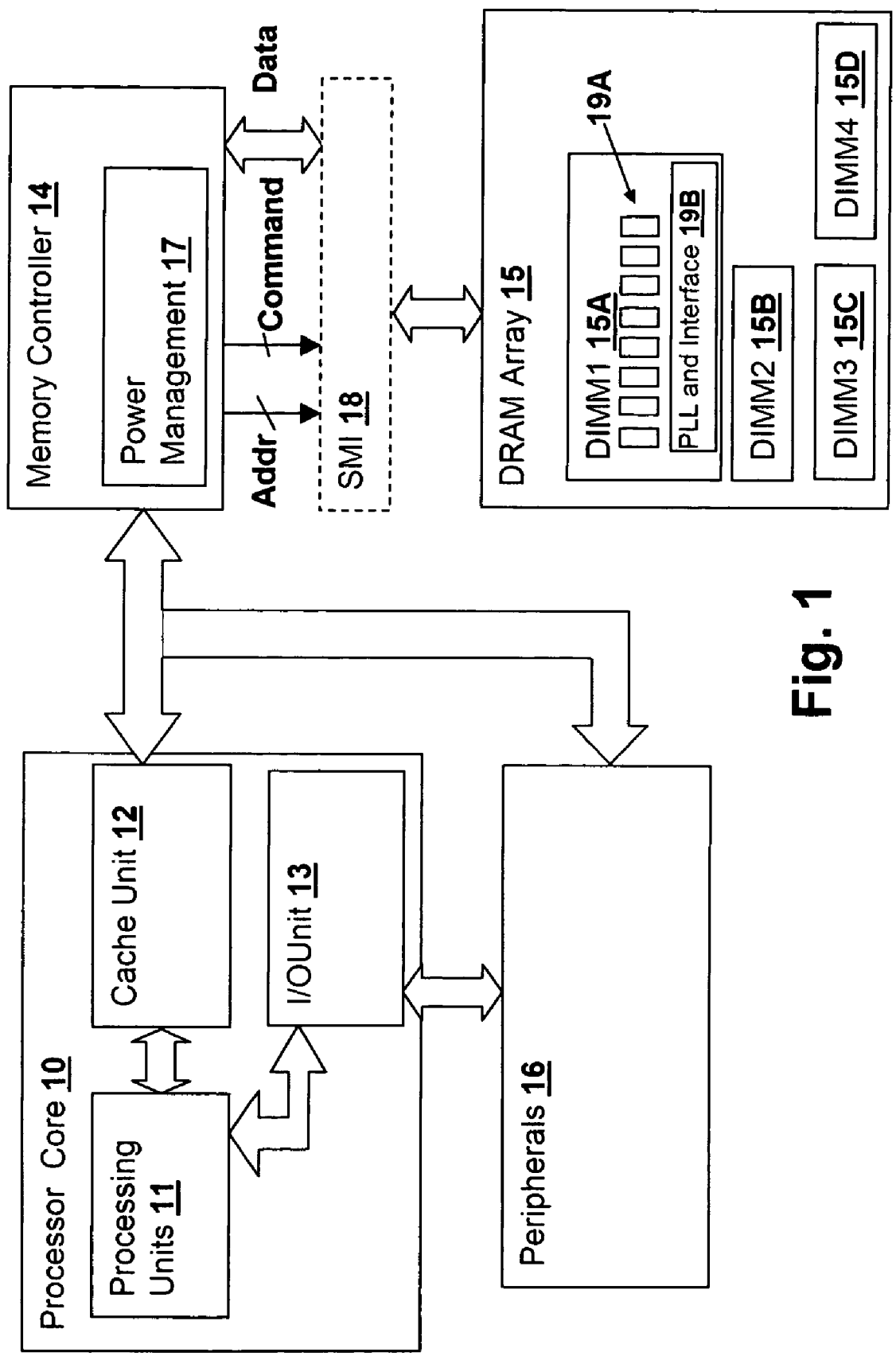
FIG. 1 is a block diagram of a computing system in accordance with an embodiment of the invention.

With reference now to the figures, and in particular with reference to FIG. 1, there is depicted a block diagram of a computer system including a memory controller 14 embodying a method and an apparatus in accordance with the present invention. Memory controller 14 is coupled to a dynamic random-access memory (DRAM) array 15 and provides control signals in the form of address lines and command strobes. Memory controller 14 is also coupled to a processor core 10 and peripherals 16 for storing and loading program instructions and data. As mentioned above, peripherals 16 may also include device controllers and controlled devices embodying the techniques and structures of the present invention, but for the purposes of illustration, the techniques and structures of the present invention will be described as embodied in and applied to memory controller 14. Memory controller 14 includes a novel power management unit 17 that stores power management settings for each memory module within DRAM array 15 on a per-process basis for two or more processes that are executed sequentially by processor core 10 on an interleaved basis. Processor core 10 includes multiple processing units 11 coupled to an I/O unit 13 that provides for communication with peripherals 16 and device controllers such as memory controllers 14. Processor core 10 also includes one or more cache units 12 that generally provide the memory interface to memory controller 14.

In larger systems, multiple DRAM arrays 15 may be coupled to memory controller 14 by one or more Synchronous Memory Interfaces (SMIs) 18 which provide partitioning of the memory subsystem into large banks. If incorporated, SMIs 18 could also include some of the features of the present invention, such as usage counters/evaluators and/or per-thread power settings for the memory nodes as described below. Therefore, any inclusion of portions of the structures techniques of the present invention within SMIs 18, should be understood as contemplated by the present invention, as SMIs 18 are device controllers within the context of the present invention.

DRAM array 15 includes multiple dual in-line memory modules (DIMMs) 15A-15D, each of which can be power-managed separately. Other power-management granularity is possible, such as powering down banks within DIMMs 15A-15D, if bank-level power management is possible. However, in general, power management at present is generally performed at the DIMM level. DIMMs 15A-15D each include memory devices 19A and interface circuits 19B that include a phase-lock loop (PLL) for synchronizing the memory device 19A with the DIMM bus interface to SMI 18 or memory controller 14. The power management states available for setting within DIMMs 15A-15D, vary based on design, but generally a low-power standby state, a power down mode, and a self-refresh state are available. In the self-refresh state, the external PLL within interface circuits 19B can be disabled. The PLL consumes a significant amount of the total power consumed by DIMMs 15A-15D, so the self-refresh state is a very desirable power management state, but the recovery time for the self-refresh state is very high, as the PLL must be reactivated and re-synchronize memory devices 19A with the external bus.

In order to effectively use the per-process selective DIMM power management, known techniques within the operating system memory manager are employed to effectively group allocated memory resources so that the resources are aggregated within the minimum number of memory modules. Power-Aware Virtual Memory (PAVM) provides operating system awareness of which memory modules may be accessed by a process and improvements to the page allocator are employed to allocate pages within a preferred module or set of modules, so that pages are not randomly allocated within the entire physical memory. Random allocation leads to a state in which all memory modules must remain active in order to avoid performance degradation. However, when multiple processes are being interleaved, it is desirable to have different preferred modules for each process, so that when a process is switched out, the memory associated with the process can be placed in a power-saving state. However, for shared libraries and the disk page cache (which is not process-specific), the allocated pages are generally spread across the preferred modules. To solve this problem, a technique known as Library Aggregation is employed that uses a sequential "first-touch" policy in the page allocator for these non-process specific allocations. Pages are allocated for the shared libraries and page cache linearly in the memory space, beginning at module 0 and moving forward only when the previous module is full, assuring that pages used by the page cache and shared library are not spread across more modules than necessary.

Even with the above-described techniques, as system execution proceeds, pages are scattered outside of the preferred modules for each process. Some of the effect is introduced by sharing, but some is caused by past sharing and past file accesses in the page cache. A system thread that is awakened on a periodic basis checks to see if pages private to a process are outside of a preferred module, and if so, they are migrated to the preferred module if possible. Also, shared pages that are outside of a process's preferred module are migrated backward in memory, if possible, so that the shared pages are aggregated.

With the above-described collection techniques, memory accessed by a process and by the kernel for the process can be expected to lie within a minimum number of preferred modules and a minimum number of non-preferred modules used for shared libraries or by the kernel for the page cache. The above techniques increase the chances that one or more memory modules can be either powered down, or placed in a low power mode when a given process is activated. PAVM alone, however, is not capable of fine-grained power control of memory modules, as the operating system is not generally aware of which modules a process is accessing, only which modules are allocated for a process. Second, the processor and operating system software would have to update memory power state information and controls at each context switch, which introduces kernel overhead.

Memory controller based power management has been proposed that does provide fine-grained control of memory module power and can monitor the frequency of access to a module very effectively. However, existing memory controllers are typically not aware of the origin of the accesses and do not have sufficient information about the operating system control of processes to make intelligent decisions about which memory modules can be placed in power-saving states without incurring a significant performance penalty. Further, the states of any access frequency information are typically lost at each context switch, or represent access frequency spread across multiple processes. The present invention bridges this gap by saving usage evaluation states at the context switch, thereby isolating the evaluation of device use to each process, while providing the ability to evaluate device use on more than a single process slice. The device controller provides power management control via registers and threshold evaluators introduced within the memory controller, portions of which may be alternatively located within the SMIs or memory modules themselves. Local control of power management permits the device controller to issue power management control commands to the controlled devices. When the use of a device falls below a threshold, which may be fixed or adaptive, the device controller sends a command to lower the power usage state of the device, without requiring that the system processor(s) intervene in the power management decision.

Figure 2:
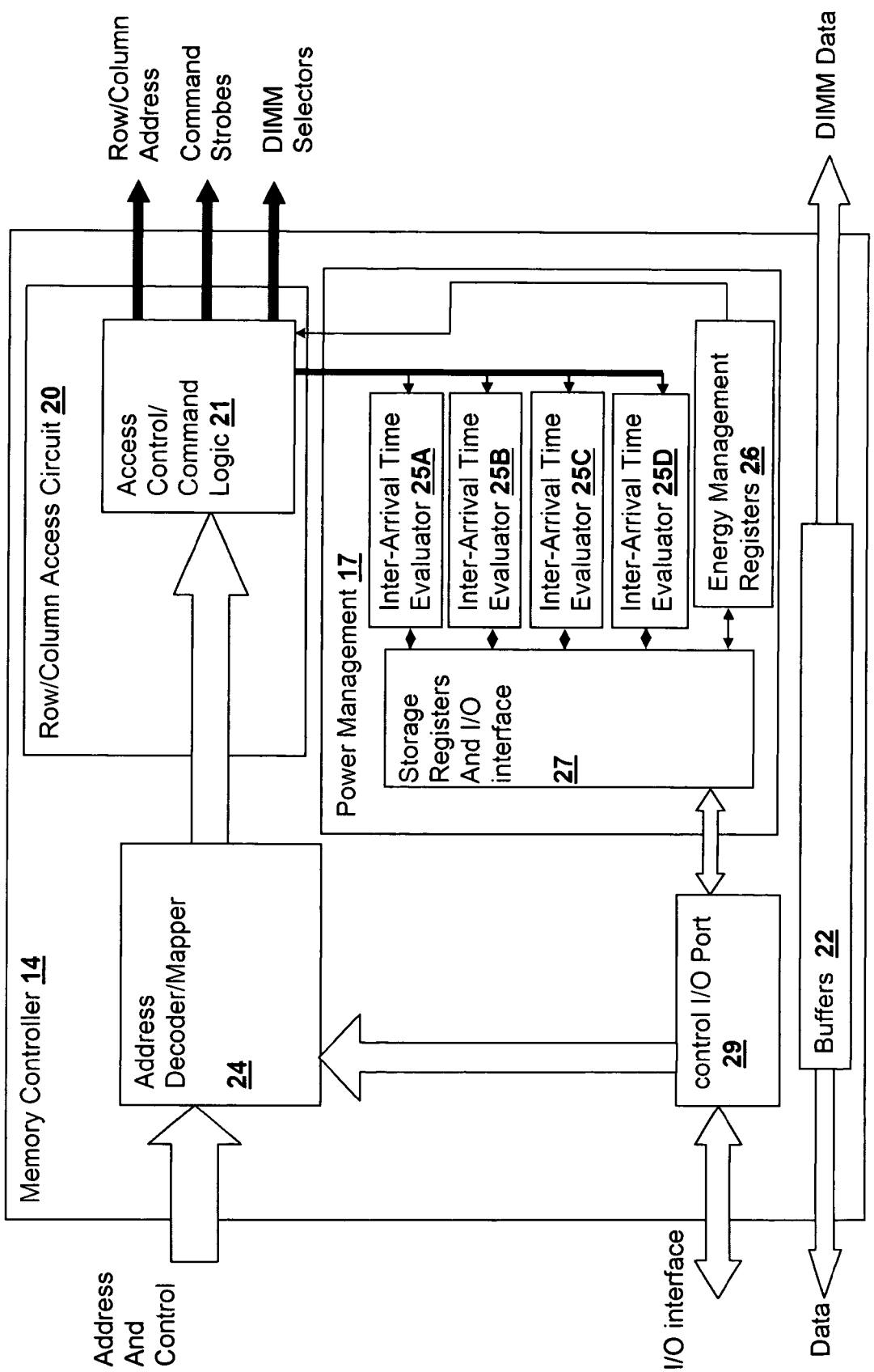
FIG. 2 is a block diagram depicting a memory controller in accordance with an embodiment of the present invention.

Referring now to FIG. 2, details of memory controller 12 are depicted in accordance with an embodiment of the present invention. FIG. 2 is also used generally to describe various embodiments of the present invention in the form of alternative structures in which some internal blocks will be mentioned as optionally located in SMIs or memory modules as described above.

Address and control signals are provided to an address decoder/mapper 24 from processor core 10, peripherals 16 or may be generated internally in the case of refresh or cache control implementations. Address decoder/mapper 24 provides signals to a row/column access circuit 20 that provides command strobes, and DIMM selectors as well as column/row address signals to DIMMs 15A-D via access control/command logic 21 for performing memory accesses. Access control/command logic also forwards commands from power management unit 17 to DIMMs 15A-D for setting power management states of individual DIMMs 15A-D. In embodiments where access counters are provided within DIMMs 15A-D, commands are also forwarded to retrieve the access counts for use by power management unit 17. Memory controller 14 also includes data buffers 22 for buffering data transferred to and from DIMMs 15A-D, as well as a control I/O port 29 for receiving control information from processor core 10, as well as providing register read ports from which processor core 10 can retrieve the current status of memory controller 14. Additionally, control I/O port 29 provides access to registers within power management unit by processor core 10 as will be described in detail below.

Power management unit 17 includes a plurality of energy management registers 26, provided on a per-device basis (one set for each of DIMMs 15A-D in the depicted embodiment). The values set in energy management registers 26 provide for control of power management states of DIMMs 15A-D and may include direct state setting values, overriding local control by power management unit 17, as well as control of the states to which power management unit 17 can set a particular DIMM. Thresholds may also be programmed via energy management registers 26, as well as the type of thresholds to be applied, if multiple threshold types are supported by the power management logic. In general, threshold values may be a single fixed threshold, in which the current inter-arrival time (or other significant indicator of memory use such as access frequency) of memory accesses for a given process and module is compared to a level programmed by the operating system. When the inter-arrival time exceeds the predetermined threshold, the particular module is placed in a lower-power operating mode by the device controller via access control and command logic 21. Alternatively, an adaptive threshold may be selected and the threshold adaptively adjusted by power management unit 17 logic so that the threshold level is adjusted based on historical access to the module by the process, or adjusted based on accesses to other modules (power prioritization for limited power allocation schemes).

Power management unit 17 also includes inter-arrival time evaluators 25A-D that statistically measure the inter-arrival time for each of DIMMs 15A-D for the currently running process. As mentioned above, inter-arrival time evaluators 25A-D could be located in DIMMS or the DIMMS could include counters that evaluators 25A-D use to update their statistics, and if so implemented, may be read by power management unit 17 via commands sent through access control/command logic 21. By whatever mechanism the inter-arrival counts and/or statistics are obtained, upon a context switch, indicated by processor core 10 via control I/O port 29, the state of the inter-arrival statistics may read and stored external to memory controller 14, and written to memory controller 14, so that when a process is swapped out, the state of the on-going evaluation may be save and then later restored. Storage registers and I/O interface 27 provides the mechanism by which the operating system via a system processor can capture and store the state of evaluators 25A-D, and may be snapshot registers that capture the states of the evaluator for each device and temporarily the states until the operating system can store them, or may use simple output buffers that permit reading of the evaluator state directly. Storage registers and I/O interface 27 also provides an input port for writing values corresponding to a state of evaluators 25A-D, so that the saved states for a process switched-out can be restored on the next context switch that activates that process. Control I/O port 29 provides the connection of I/O interface to an external bus for access by the system processor(s).

Figure 3:
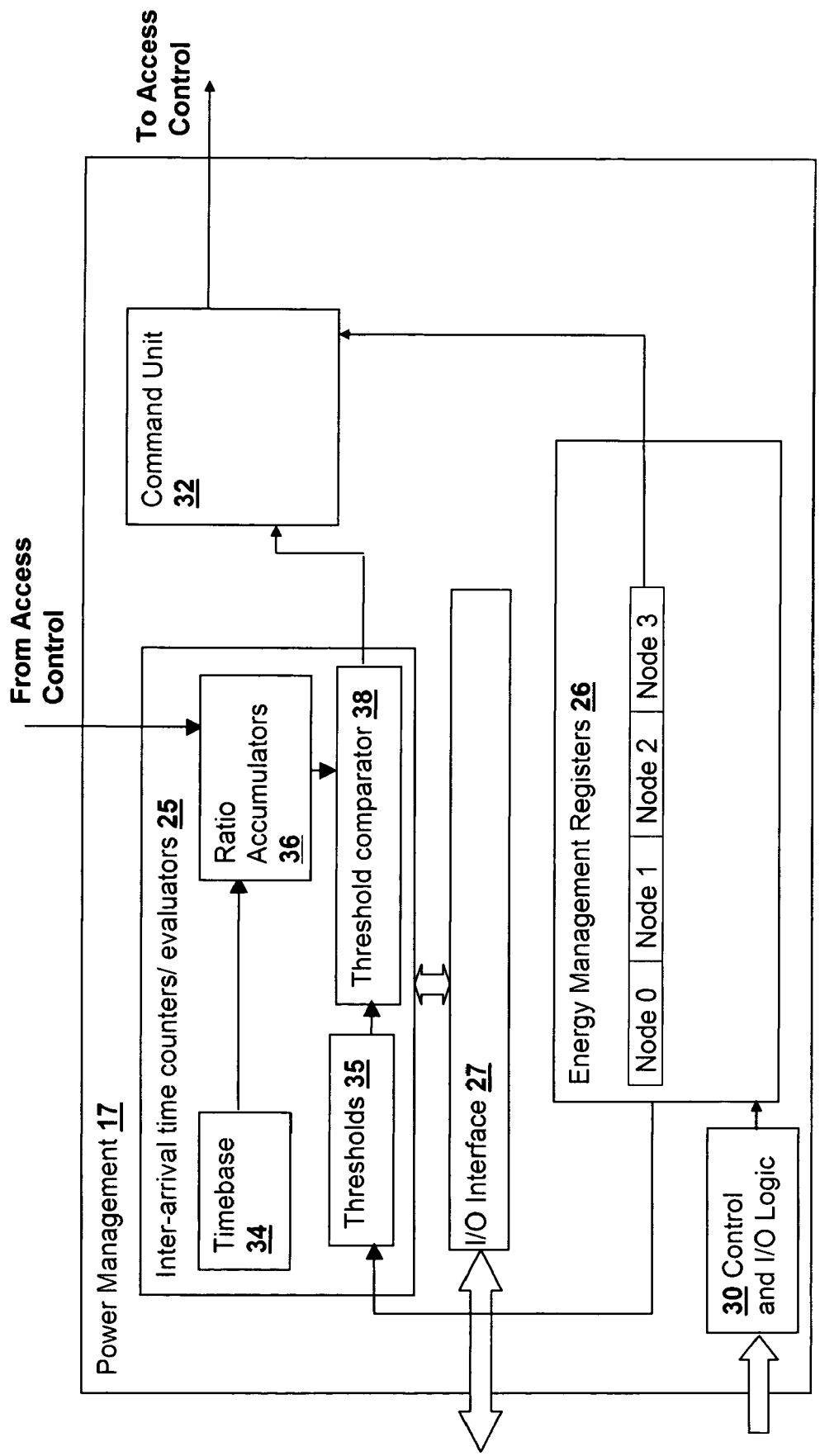
FIG. 3 is a block diagram depicting a power management unit in accordance with an embodiment of the present invention.

Referring now to FIG. 3, further details of power management unit 17 are depicted. Inter-arrival time counters/evaluators 25 for each node determine whether the infrequency of accesses to each node justifies setting a lower power management level and if such determination is made, commands are sent to DIMMS 15A-15D via command unit 32. As mentioned above, upon a context switch, the states of counters/evaluators 25 are read via I/O interface 27 and are stored along with other per-process state information (such as registers) in buffers maintained by the operating system kernel. Previously stored states associated with the next process are retrieved from memory and sent via I/O interface 27 to counters/evaluators 25. Energy management registers 26 are also programmed by the kernel for the current process and the registers are coupled to command unit 32 to apply any overrides of local control. Energy management registers 26 are also coupled to counters/evaluators 25 to apply any threshold information set by the operating system via threshold registers 35. Energy management registers 26 may also include energy management to selectively enable evaluators 25, in particular for turning off evaluators when local control is disabled, in order to conserve the power consumed by evaluators 25, but are also used to enable evaluators periodically when the system is in a power-conserving state.

Evaluators 25 compare a number of accesses performed for each device through access control 21 to a fixed timebase 34 via ratio accumulators 36, which estimate the inter-arrival time of accesses based on the frequency of accesses versus timebase 34 counts. A threshold comparator 38 compares the value of the ratio accumulator 36 to a fixed or adaptively derived threshold 35 and if the access inter-arrival time rises above the threshold 35 value, directs command unit 32 to lower the power consuming state of the device, and command unit 32 directs command logic to do so if local control is enabled in the associated energy management register 26 for the device.

Figure 4:
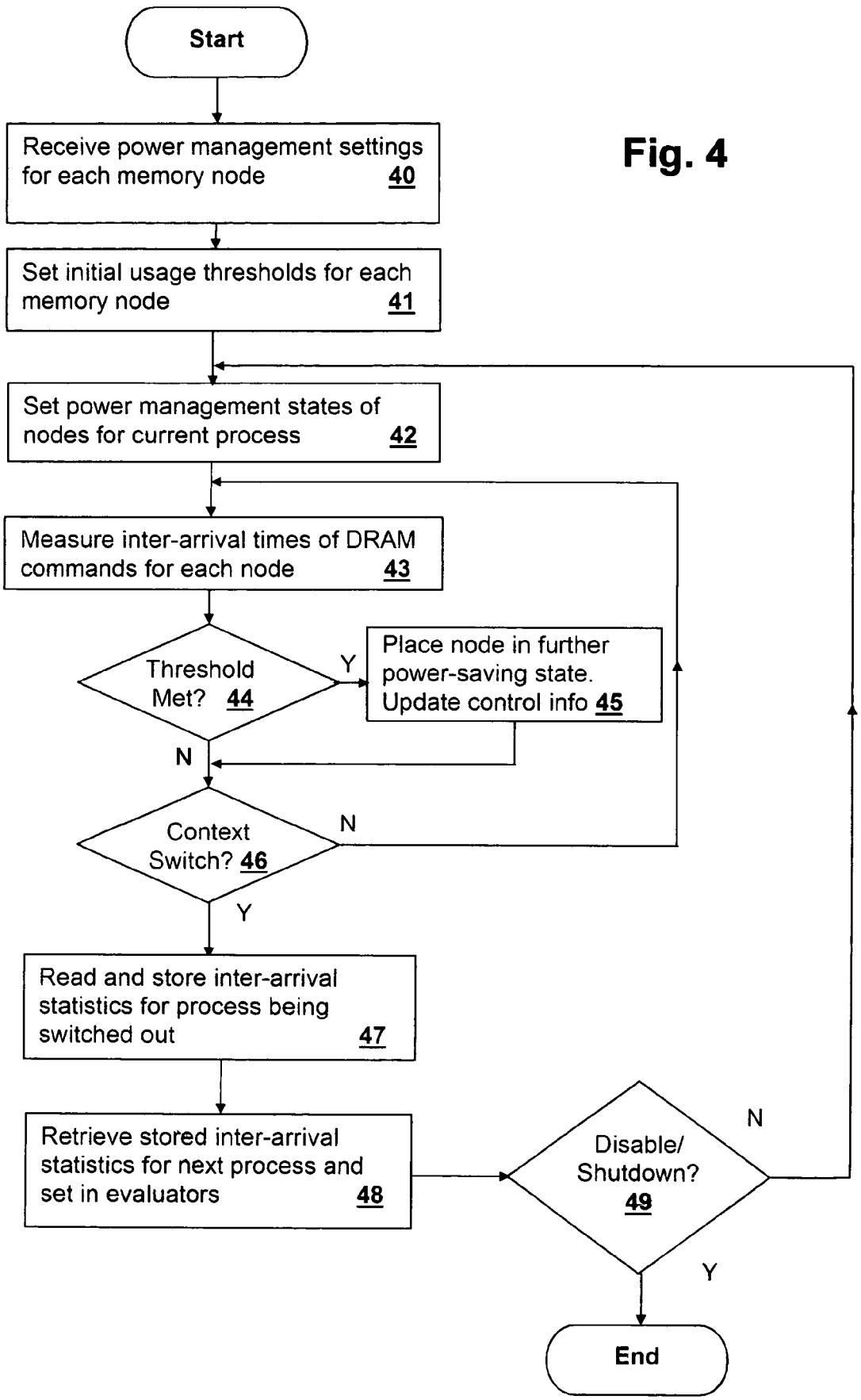
FIG. 4 is a flowchart depicting a method in accordance with an embodiment of the present invention.

Referring now to FIG. 4, a flowchart depicting a method in accordance with an embodiment of the invention is shown. First, memory controller 14 (or other unit incorporating the power management control mechanisms disclosed above) receives initial power management settings for each node (step 40) and sets the initial thresholds (step 41) and power management states for each node (step 42). Inter-arrival times are measured for each memory node during execution of the current process (step 43). If a threshold value of inter-arrival time is met (decision 44), the memory module is placed in a lower power-consuming state (step 45) by the memory controller directly. without intervention by the processor. Next, when a context switch occurs (decision 46), the inter-arrival time statistics are saved for the process being switched out (step 47) and the previously-saved statistics for the current process are restored (step 48). Until the scheme is disabled or the system shut down (decision 49), the new power management states are set for the process being activated, i.e., the new current process (step 42) and steps 42-49 are repeated.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A device controller for coupling one or more controlled devices to one or more processors in a processing system, comprising:
    a command unit for sending commands to said one or more devices;
    at least one usage evaluator having an input coupled to an output of said command unit for evaluating a frequency of use of an associated controlled device;
    control logic coupled to said usage evaluator and further coupled to an input of said command unit for sending power management commands in response to said usage evaluator detecting that a usage level of said associated device has fallen below a threshold level, whereby said device controller power manages said controlled device without intervention by said one or more processors;
    an output port coupled to said at least one usage evaluator for reading a state of said at least one usage evaluator, whereby a state of said at least one usage evaluator may be stored external to said device controller; and
    an input port coupled to said at least one usage evaluator for setting a state of said at least one usage evaluator, whereby said state of said at least one usage evaluator may be restored from information stored external to said device controller.

2. The device controller of claim 1, wherein said device controller is a memory controller, and wherein said controlled devices are memory modules.

3. The device controller of claim 2, wherein said at least one usage evaluator comprises an interarrival time counter for determining an interval between accesses to said associated memory module.

4. The device controller of claim 1, further comprising one or more power management control registers, each associated with a particular one of said one or more controlled devices, each coupled to said input port of said device controller and further coupled to said command unit, whereby a power management control state for said associated controlled device can be set by said one or more processors and set in said associated controlled device by said device controller.

5. The device controller of claim 4, wherein said power management control registers are further coupled to said at least one usage evaluator, whereby values of said power management control registers are adjusted in conformity with a result of said evaluating.

6. The device controller of claim 1, wherein said evaluator further comprises an adaptive threshold circuit for adjusting said threshold in response to said evaluated frequency of use of said one or more controlled devices.

7. The device controller of claim 1, wherein said one or more controlled devices include a counter for determining a level of usage of each controlled device during a current process, and wherein said device controller further comprises another input port coupled to each of said controlled devices for reading a value of said counter, and wherein said control logic updates said at associated evaluator in conformity with said value of said counter.

8. The device controller of claim 7, wherein said device controller is a memory controller, wherein said controlled devices are memory modules incorporating usage counters, and wherein said control logic is coupled to said command logic whereby said control logic periodically reads current counts from said memory modules.

9. A processing system, comprising:
a processor;
a memory coupled to said processor for storing program instructions and data values;
a device controller coupled to said processor;
one or more controlled devices coupled to said device controller, wherein said controlled devices have multiple power management states, and wherein said device controller includes a command unit for sending commands to said one or more devices, at least one usage evaluator having an input coupled to an output of said command unit for evaluating a frequency of use of an associated controlled device, and control logic coupled to said usage evaluator and further coupled to an input of said command unit for sending power management commands in response to said usage evaluator detecting that a usage level of said associated device has fallen below a threshold level, whereby said device controller power manages said controlled device without intervention by said processor, and wherein said device controller further includes an output port coupled to said at least one usage evaluator for reading a state of said at least one usage evaluator by said processor, whereby a state of said at least one usage evaluator may be stored in said memory by said processor, and an input port coupled to said at least one usage evaluator for setting a state of said at least one usage evaluator by said processor, whereby said state of said at least one usage evaluator may be restored from said memory.

10. The processing system of claim 9, wherein said device controller is a memory controller, and wherein said controlled devices are memory modules.

11. The processing system of claim 9, wherein said at least one usage evaluator comprises an inter-arrival time counter for determining an interval between commands sent to said associated controlled device.

12. The processing system of claim 9, wherein said device controller further comprises one or more power management control registers, each associated with a particular one of said one or more controlled devices, each coupled to said input port of said device controller and further coupled to said command unit, whereby a power management control state for said associated controlled device can be set by said processor and set in said associated controlled device by said device controller.

13. A method of managing power in a processing system, comprising:
sending power management setting information for devices controlled by a device controller to said device controller;
evaluating a usage of each of said controlled devices within said device controller in order to determine whether or not said usage has fallen below a threshold;
sending power management commands from said device controller to said controlled devices in conformity with a result of said determining, whereby said device controller manages a power management state of said controlled devices without processor intervention;
receiving an indication of a context switch activating a second process and deactivating a first process; and
in response to said receiving, saving a state of said evaluating;
second receiving a second indication of a second context switch reactivating said first process; and
in response to said second receiving, restoring said saved state of said evaluating, whereby said evaluating commences from the previously stored state.

14. The method of claim 13, further comprising retrieving usage counts from said controlled devices, and wherein said evaluating is performed in conformity with said retrieved usage counts.

15. The method of claim 13, further comprising adjusting said threshold in accordance with a result of said evaluating, whereby said evaluating is made adaptive to said usage.

16. The method of claim 13, wherein said device controller is a memory controller, wherein said controlled devices are memory modules, wherein said sending sends power management setting information to said memory modules, and wherein said evaluating determines a frequency of accesses to said memory modules.

\* \* \* \* \*